United States Patent [19]

Redeker et al.

[11] 4,449,988
[45] May 22, 1984

[54] MACHINE TOOL FEED SCREW DRIVE

[75] Inventors: Werner Redeker, Börnsen; Uwe Uhlig, Buchholz, both of Fed. Rep. of Germany

[73] Assignee: Hauni-Werke Körber & Co. KG., Hamburg, Fed. Rep. of Germany

[21] Appl. No.: 343,739

[22] Filed: Jan. 29, 1982

[30] Foreign Application Priority Data

Feb. 20, 1981 [DE] Fed. Rep. of Germany ....... 3106238

[51] Int. Cl.³ ............................................. B24B 47/02
[52] U.S. Cl. ..................................... 51/165.8; 74/664; 192/8 R; 192/2; 474/148
[58] Field of Search .............. 474/148; 74/664, 665 P; 192/8 R, 15, 1, 2; 51/165.8, 165.81

[56] References Cited

U.S. PATENT DOCUMENTS

| | | | |
|---|---|---|---|
| 2,471,969 | 5/1949 | Meyer | 474/148 |
| 3,260,125 | 7/1966 | Dolza | 474/148 |
| 3,401,777 | 9/1968 | Williams | 192/8 R |
| 3,434,246 | 3/1969 | Adlaf | 51/165.81 |
| 3,695,402 | 10/1972 | Klemm | 192/8 R |
| 4,226,311 | 10/1980 | Johnson | 192/8 R |

Primary Examiner—Harold D. Whitehead
Attorney, Agent, or Firm—Peter K. Kontler

[57] ABSTRACT

A surface grinding machine wherein a tool holder is mounted on an upright feed screw which is in mesh with a rotary spindle nut. The latter is held against axial movement in the column of the grinding machine and is normally driven by a torque transmitting unit having an endless toothed belt trained over a first pulley which is coaxial with the nut and a second pulley mounted on the output shaft of an electric motor. A gear train is installed in parallel with the torque transmitting unit to prevent automatic lowering of the tool holder when the belt breaks. The gear train has a first gear coaxial with the first pulley, a second gear coaxial with the second pulley and an additional gear meshing with the first and second gears. The tension of the belt is monitored by a detector which transmits a signal when the belt breaks, and such signal is used to immediately arrest the motor.

10 Claims, 2 Drawing Figures

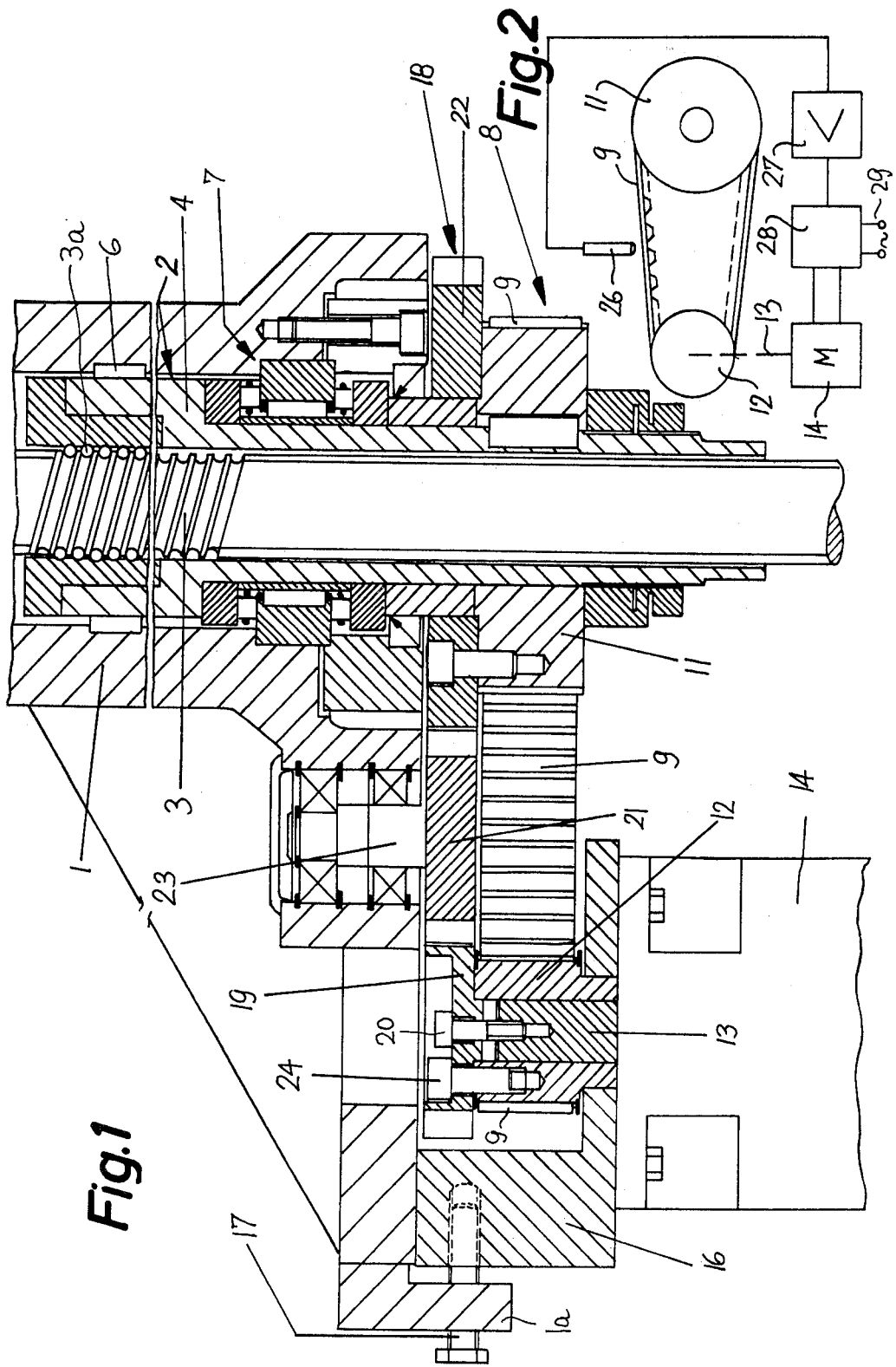

MACHINE TOOL FEED SCREW DRIVE

BACKGROUND OF THE INVENTION

The present invention relates to machine tools in general, and more particularly to improvements in machine tools wherein one or more parts are movable up and down by displacing units of the type employing an upright feed screw and a spindle nut which meshes with the feed screw. Typical examples of such machine tools are many surface grinding machines wherein one or more tool carriers are movable up and down in response to rotation of the feed screw relative to the nut or vice versa.

Displacing units which employ a feed screw and a mating nut can be used with advantage in many types of machine tools, i.e., not only in surface grinding machines. In many instances, the feed screw is designed to move axially, i.e., up and down, and to share its movements with a carrier for one or more tools. If the machine tool is designed to treat the workpieces with a very high degree of precision, the feed screw is rotated in spherical or otherwise configurated rolling elements so as to reduce the extent of stray movement when the feed screw is caused to move up or down. As a rule, the means for driving the feed screw or the nut includes a motor and a suitable transmission, for example, a torque transmitting unit which employs several toothed pulleys or gears and an endless toothed belt trained over the pulleys. If the displacing unit is not provided with any self-locking means, breaking of the toothed belt can entail uncontrolled and rapid descent of the feed screw with the part or parts which are secured thereto. This can cause serious damage to the machine, lengthy interruptions in operation, as well as injury to the attendants. Uncontrolled descent of vertically movable parts is particularly dangerous in many types of grinding machines wherein the feed screw carries one or more carriers for grinding wheels which can be destroyed when the belt breaks and the feed screw descends at an excessive speed. Destruction of the grinding wheel or wheels can cause serious injuries.

OBJECTS AND SUMMARY OF THE INVENTION

An object of the invention is to provide a novel and improved arrangement which reduces the danger of uncontrolled movements of vertically movable components of displacing units wherein an upright feed screw mates with a nut and the rotary component receives torque from a prime mover by way of a toothed belt transmission.

Another object of the invention is to provide the just outlined arrangement with novel and improved means for preventing uncontrolled movements of the vertically movable component of the displacing unit when the toothed belt breaks or when the belt transmission becomes inoperative for another reason.

A further object of the invention is to provide novel and improved means for preventing uncontrolled movements of vertically movable parts in displacing units which normally receive torque from belt transmissions and which are devoid of any self-locking features.

An additional object of the invention is to provide a machine tool which embodies the above outlined arrangement.

Still another object of the invention is to provide a grinding machine, especially a surface grinding machine, which embodies the above outlined arrangement.

An additional object of the invention is to provide an arrangement which initiates automatic stoppage of all moving parts when the belt transmission which normally transmits torque to the rotary component of the displacing unit is out of commission.

An ancillary object of the invention is to provide an arrangement which can be installed in many types of existing machine tools to enhance their safety and to reduce the likelihood of danger to attendants in the event of malfunction of means which normally transmits torque from the prime mover to the rotary component of the displacing unit.

The invention resides in the provision of a machine tool, particularly a surface grinding machine, which comprises a displacing unit including a first component which constitutes an upright feed screw and a second component which constitutes a nut meshing with and coaxial to the feed screw. One of the two components (e.g., the nut) is rotatable relative to the other component to thereby move one of the components (e.g., the feed screw) axially. The machine tool further comprises reversible prime mover means (e.g., a variable-speed electric motor), a first torque transmitting unit which is interposed between the prime mover means and the rotatable component to normally rotate the rotatable component and which comprises an endless toothed belt, and a second torque transmitting unit interposed between the prime mover means and the rotatable component and comprising a gear train disposed in parallel with the first torque transmitting unit.

The gear train comprises a plurality of gears mating with a preferably adjustable play, and the machine tool preferably further comprises means for adjusting the extent of play between the gears of the second torque transmiting unit. The gear train preferably comprises an odd number of (e.g., three) gears.

In accordance with a further feature of the invention, the machine tool can comprise means for monitoring the tension of the toothed belt and means for arresting the prime mover means when the monitored tension of the toothed belt is below a preselected threshold value, preferably when the monitored tension is indicative of the fact that the belt is broken or torn so that the first torque transmitting unit has ceased to drive the rotary component of the displacing unit.

If the feed screw is movable axially of the nut, the machine tool comprises a column or analogous means for rotatably holding the nut against axial movement. The means for varying the extent of play between the gears of the gear train can simultaneously serve to vary or adjust the tension of the toothed belt forming part of the first torque transmitting unit. The transmission ratio of the first torque transmitting unit is preferably identical or very similar to the transmission ratio of the second torque transmitting unit.

The first torque transmitting unit preferably further comprises a first toothed pulley or gear which is coaxial with and is rigidly secured to the rotary component of the displacing unit, and a second toothed pulley or gear which receives torque from the prime mover means and is preferably mounted on the output shaft of the prime mover means. The toothed belt is trained over such pulleys, and the gear train preferably comprises a first gear which is coaxial with the first pulley, a second gear which is coaxial with the second pulley, and an additional gear which meshes with the first and second gears.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a machine tool which embodies one form of the invention and wherein the torque transmitting device which includes a toothed belt transmits torque to the spindle nut of the displacing unit; and FIG. 2 is a schematic plan view of a portion of a second machine tool wherein the prime mover is automatically arrested in response to breakage of the toothed belt.

DESCRIPTION OF THE PREFERRED EMBODIMENTS

FIG. 1 illustrates a portion of a machine tool which constitutes a surface grinding machine, e.g., a grinding machine of the class disclosed in commonly owned copending application Ser. No. 232,250 filed Feb. 6, 1981 by Redeker et al. The machine tool comprises a frame having an upright column 1 having a vertical bore which accommodates a displacing unit 2 including an upright feed screw 3 and a rotary spindle nut 4 which is rotatable but cannot move axially in the column 1. Thus, when the nut 4 is rotated in a clockwise or counterclockwise direction, the feed screw 3 moves axially (up or down) to move a suitable carrier (not shown) for one or more tools, e.g., a carrier for a set of coaxial grinding wheels. The grooves of the external thread on the feed screw 3 receive spherical rolling elements 3a which are partially confined in the nut 4. The displacing unit 2 including the feed screw 3 and nut 4 does not embody and is not combined with any self-locking means. It goes without saying that the present invention can be embodied in any machine tool or another machine which has a displacing unit including a feed screw and a mating nut and which does not comprise self-locking means for that component which is movable up and down.

The nut 4 is rotatable in precision bearings 6 and 7 which are installed in the upright column 1 and allow the nut to rotate about the axis of the feed screw 3 while remaining stationary, as considered in the axial direction of the member 3.

The means for rotating the nut 4 comprises a first torque transmitting unit 8 which includes a first toothed pulley or gear 11 coaxial with and secured to the nut 4, a second toothed pulley or gear 12 whose axis is parallel to that of the pulley 11, and an endless toothed belt 9 which is trained over the pulleys 11 and 12. The pulley 12 is coaxial with and is affixed to the output shaft 13 of a reversible prime mover here shown as an electric motor 14 mounted in a holder 16 which is adjustable with reference to the column 1 by a screw 17. The screw 17 is rotatably mounted in a downwardly extending lug 1a of the column 1 and its externally threaded shank extends into a tapped bore of the holder 16. The axis of the adjusting screw 17 is normal to the vertical axis of the output shaft 13. By rotating the screw 17, an attendant can change the tension of the toothed belt 9.

As mentioned above, the displacing unit 2 including the components 3 and 4 is not of the self-locking type. Therefore, if the toothed belt 9 would break, and in the absence of any means which would furnish a self-locking action, the weight of the feed screw 3 and of the part or parts attached thereto (such as the aforementioned carrier for one or more grinding wheels) would set the gear 11 in rotary motion so that the feed screw 3 would descend at a progressively increasing speed. In other words, and in the absence of any self-locking action, the torque transmitting unit 8 (which is preferred in many types of machine tools because it is capable of transmitting torque without any or with negligible play between the driving and driven parts) would be likely to affect the safety of operation of the machine tool and could also endanger the attendant or attendants.

In order to reduce the likelihood of danger to attendants and/or damage to the machine tool and/or to the workpieces, and in order to avoid the use of conventional self-locking means for the torque transmitting unit 8, the machine tool which embodies the present invention further comprises a second torque transmitting unit 18 which is installed in parallel with the torque transmitting unit 8 and comprises or constitutes a gear train here consisting of an odd number of gears. A first gear 19 of the gear train or torque transmitting unit 18 is coaxial with the pulley 12, a second gear 22 of the gear train 18 is coaxial with and secured to the nut 4, and an additional gear 21 of the gear train meshes with the gears 19 and 22. The gear 21 is mounted on a shaft 23 which is journalled in the column 1. The gear 19 is secured to the output shaft 13 by a screw 20 or an analogous fastener which enables the gear 19 to hold the pulley 12 against axial movement relative to the shaft 13. A further screw 24 is parallel to the screw 20 and meshes with the pulley 12; the screw 24 extends through an arcuate slot (not specifically shown) of the gear 19 so that the angular position of the gear 19 relative to the pulley 12 and output shaft 13 can be changed on loosening of the screw 24.

The gears 19, 21 and 22 of the gear train 18 mate with a relatively large amount of play; this is considered desirable and advantageous in order to ensure that the gears 19, 21 and 22 are free to rotate when the motor 14 is on and that such gears do not interfere with the transmission of torque from the output shaft 13 to the nut 4 by way of the first torque transmitting unit 8 including the toothed belt 9. The extent of play between the teeth of the mating gears 19, 21 and 22 can be adjusted simultaneously with adjustment of tension of the toothed belt 9, i.e., by changing the angular position of the adjusting screw 17 which is designed to move the holder 16 in directions at right angles to the common axis of the output shaft 13, pulley 12 and gear 19.

It is evident that the transmission ratio of the second torque transmitting unit 18 is identical with or closely approaches the transmission ratio of the torque transmitting unit 8 including the toothed belt 9 and the pulleys 11, 12. When the belt 9 breaks, the torque transmitting unit or gear train 18 prevents unimpeded rotation of the pulley 11 and of the nut 4 so that the feed screw 3 is held against uncontrolled downward movement with attendant increase in the safety of operation of the machine tool.

FIG. 2 shows certain details of a modified machine tool which embodies a detector 26 serving to monitor the tension of the endless toothed belt 9 of the torque transmitting unit which further includes two toothed pulleys or gears 11, 12 corresponding to the similarly referenced parts in the machine tool of FIG. 1. The detector 26 may constitute an optoelectronic transducer, a mechanical sensor or an equivalent device. The signal at the output of the detector 26 is transmitted to an amplifier 27 which is connected with a control unit 28 serving to arrest the motor 14 by disconnecting it from a source 29 of electrical energy when the signal at the output of the detector 26 indicates that the tension of the belt 9 has dropped below a predetermined threshold value, namely, to a value which is indicative of breakage of the belt. The exact details of circuitry in the control unit 28 form no part of the present invention. An advantage of the detector 26 is that it ensures immediate stoppage of the motor 14 when the belt 9 breaks. This is desirable because the gear train 18 cannot transmit torque with the same degree of precision as the unit 8, i.e., the quality of workpieces which would be treated with the nut 4 rotated by the gear train 18 would be inferior to the quality of workpieces which are treated under normal operating conditions, i.e., when the nut 4 receives torque from the unit 8.

As mentioned above, the invention can be embodied with equal advantage in other types of machine tools or apparatus wherein the displacing unit for tools, workpieces or the like employs an upright feed screw and a nut which meshes with the feed screw, and wherein the displacing unit is not equipped with or does not embody a self-locking device. Furthermore, the invention can be embodied with equal advantage in machines wherein the feed screw of the displacing unit does not rotate in sets of spherical or otherwise configurated bearing elements or the like. The incorporation of the second torque transmitting unit 18 in parallel with the torque transmitting unit 8 enhances the reliability of operation and reduces the likelihood of danger to attendants. Moreover, the arrangement which is shown in FIG. 2 reduces the likelihood of production of inferior articles because the motor 14 is arrested in immediate response to breakage or tearing of the toothed belt 9. The provision of the second torque transmitting unit 18 is of particular importance in a surface grinding machine wherein the tool carrier is movable up and down in response to actuation of a displacing unit corresponding or similar to the displacing unit including the feed screw 3 and nut 4. In such a machine, unintentional and rapid descent of the tool carrier could entail destruction of the rotating grinding wheel or wheels which would represent a serious danger to the attendants.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a machine tool, particularly in a surface grinding machine, the combination of a displacing unit including a first component constituting an upright feed screw and a second component constituting a nut coaxial to and meshing with said feed screw, one of said components being rotatable relative to the other of said components to thereby move one of said components axially; prime mover means; a first torque transmitting unit interposed between said prime mover means and said rotatable component to normally rotate said rotatable component, said first torque transmitting unit comprising an endless toothed belt; and a second torque transmitting unit interposed between said prime mover means and said rotatable component to prevent uncontrolled rotation of said rotatable component in the event of breakage of said belt, said second torque transmitting unit comprising a gear train of mating gears and the transmission ratio of said gear train at least approximating the transmission ratio of said first torque transmitting unit.

2. The combination of claim 1, wherein said gear train comprises a plurality of gears mating with one another with play, and further comprising means for adjusting the extent of play between said gears.

3. The combination of claim 1, wherein said gear train comprises an odd number of mating gears.

4. The combination of claim 1, further comprising means for monitoring the tension of said belt.

5. The combination of claim 4, further comprising means for arresting said prime mover means when the monitored tension of said belt is below a preselected threshold value.

6. The combination of claim 1, wherein said feed screw is movable axially of said nut, said nut constituting said rotary component and further comprising means for rotatably holding said nut against axial movement.

7. The combination of claim 6, wherein said gear train comprises a plurality of gears meshing with one another with an adjustable amount of play, and further comprising means for varying the extent of play between said gears.

8. The combination of claim 1, wherein said feed screw has a helical thread and further comprising a support having a bore for said feed screw and rolling elements interposed between said support and said feed screw and extending into the groove of said thread.

9. The combination of claim 1, wherein said first torque transmitting means further comprises a first toothed pulley coaxial with and rigidly secured to said rotary component and a second toothed pulley driven by said prime mover means, said belt being trained over said pulleys.

10. The combination of claim 9, wherein said gear train comprises a first gear coaxial with said first pulley, a second gear coaxial with said second pulley, and an additional gear meshing with said first and second gears.

* * * * *